US011542395B2

(12) United States Patent
Gessner et al.

(10) Patent No.: US 11,542,395 B2
(45) Date of Patent: Jan. 3, 2023

(54) COATING SYSTEM FOR RMA CROSSLINKABLE COATING COMPOSITIONS

(71) Applicant: Allnex Netherlands B.V., Bergen Op Zoom (NL)

(72) Inventors: Michael Anthony Gessner, La Grange, KY (US); Richard Hendrikus Gerrit Brinkhuis, Zwolle (NL)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 439 days.

(21) Appl. No.: 16/612,871

(22) PCT Filed: May 15, 2018

(86) PCT No.: PCT/EP2018/062573
§ 371 (c)(1),
(2) Date: Nov. 12, 2019

(87) PCT Pub. No.: WO2018/210846
PCT Pub. Date: Nov. 22, 2018

(65) Prior Publication Data
US 2020/0140693 A1 May 7, 2020

Related U.S. Application Data

(60) Provisional application No. 62/506,651, filed on May 16, 2017.

(51) Int. Cl.
| C09D 5/00 | (2006.01) |
| C09D 7/20 | (2018.01) |
| C09D 133/14 | (2006.01) |
| C09D 167/02 | (2006.01) |
| C09D 167/08 | (2006.01) |

(52) U.S. Cl.
CPC ............... *C09D 5/002* (2013.01); *C09D 7/20* (2018.01); *C09D 133/14* (2013.01); *C09D 167/02* (2013.01); *C09D 167/08* (2013.01)

(58) Field of Classification Search
CPC ........ C09D 5/002; C09D 7/20; C09D 133/14; C09D 167/02; C09D 167/08
See application file for complete search history.

(56) References Cited

U.S. PATENT DOCUMENTS

| 5,011,994 A | 4/1991 | Bartels et al. |
| 7,001,958 B2 | 2/2006 | Pelosi et al. |

FOREIGN PATENT DOCUMENTS

| EP | 0 199 087 | 3/1986 |
| EP | 0 326 723 | 8/1989 |
| EP | 1 462 501 | 9/2004 |
| EP | 2 556 108 | 10/2011 |
| WO | 2011/124663 | 10/2011 |
| WO | 2011/124664 | 10/2011 |
| WO | 2011/124665 | 10/2011 |
| WO | 2013/050574 | 4/2013 |
| WO | 2013/050622 | 4/2013 |
| WO | 2013/050623 | 4/2013 |
| WO | 2013/050624 | 4/2013 |
| WO | 2014/166880 | 10/2014 |
| WO | 2016/166361 | 10/2016 |
| WO | 2016/166371 | 10/2016 |
| WO | 2016/166381 | 10/2016 |
| WO | 2016/166382 | 10/2016 |

OTHER PUBLICATIONS

International Search Report (ISR) dated Jul. 10, 2018 in International (PCT) Application No. PCT/EP2018/062573.

*Primary Examiner* — Robert S Walters, Jr.
(74) *Attorney, Agent, or Firm* — Wenderoth, Lind & Ponack, L.L.P.

(57) ABSTRACT

The invention relates to a coating system comprising I) a primer coating composition comprising a binder component PA that contains primary amine functionality blocked with a ketone or aldehyde, a binder component PB that contains acetoacetate or acetoacetamide functional groups and II) a RMA crosslinkable coating composition a component A with at least two acidic protons C—H in activated methylene or methine groups, a component B with at least two activated unsaturated C=C groups and a base crosslinking catalyst C. The invention also relates to the use of the specified primer coating composition for improving adhesion of a RMA crosslinkable coating composition, in particular to metal substrates, to a method for coating a substrate and to coated substrates coated with the coating system of the invention.

15 Claims, No Drawings

COATING SYSTEM FOR RMA CROSSLINKABLE COATING COMPOSITIONS

The invention relates to a coating system for improving adhesion of a RMA crosslinked coating to a substrate. The invention further relates to the use of a primer composition for improving adhesion of RMA crosslinkable top coating compositions, to a method for coating a substrate and to the improved coated substrates obtainable by the invention.

RMA crosslinkable compositions are compositions comprising at least one RMA crosslinkable component comprising components A and B each comprising at least 2 reactive groups wherein the at least 2 reactive groups of component A are acidic protons (C—H) in activated methylene or methine groups (RMA donor group), and the at least 2 reactive groups of component B are activated unsaturated groups (C=C) (RMA acceptor group). These reactive groups react to achieve crosslinking by Real Michael Addition (RMA) reaction between said at least one RMA crosslinkable components in the presence of a base catalyst (C).

Such RMA crosslinkable compositions are described in EP2556108. Herein a special catalyst C is described which is a substituted carbonate catalyst which decomposes in a coating layer to generate carbon dioxide which evaporates from the applied curing coating layer and a strong base which starts the RMA crosslinking reaction. The catalyst provides long pot-life and at the same time a high reactivity when applied as a coating layer where CO2 can escape.

The problem underlying the invention is that the RMA crosslinkable compositions may show undesirably poor adhesion properties in particular to polar surfaces for example in applications on metal surfaces.

It is known in the coating industry to provide on the metal surface a primer layer or to improve adhesion with known metal pretreatments like silane treatment.

In the General Industrial, Marine, Protective, and ACE markets, topcoats are usually applied over an epoxy-amine primer. Adhesion studies of coatings based on RMA crosslinkable compositions were carried out over many different types of commercially available epoxy primers used in a wide field of end use applications including general industry, ACE and protective coatings. However, known epoxy primers do not always give good adhesion results for coatings based on RMA crosslinkable compositions.

WO2016/166371 describes a method for improving adhesion of a RMA crosslinked coating comprising the steps of I) providing an RMA crosslinkable composition comprising, II) applying on the substrate surface a layer of an epoxy primer comprising an epoxy functional polymer binder and a crosslinker, wherein adhesion of the RMA crosslinked coating to the epoxy primer layer is improved by said primer comprising after curing functional groups X reactable with RMA crosslinkable component A or B of the RMA crosslinkable composition.

However, it is inconvenient to have to modify existing epoxy primers and more importantly, there is a desire to further improve the adhesion of RMA coating compositions.

According to the invention this problem has been solved by a coating system comprising I. a primer coating composition and II. a RMA crosslinkable coating composition. The primer coating composition comprises a) a binder component PA that contains primary amine functionality blocked with a ketone or aldehyde, preferably a ketone, b) a binder component PB that contains acetoacetate or acetoacetamide, preferably acetoacetate-, functional groups, which components PA and PB form an organic binder network in a cured primer coating. The primary amine functionality blocked with a ketone or aldehyde are ketimine or aldimine functional groups. The RMA crosslinkable coating composition comprises a) a component A with at least two acidic protons C—H in activated methylene or methine groups, b) a component B with at least two activated unsaturated C=C groups, c) a catalyst C for catalyzing the RMA crosslinking reaction between components A and B, d) preferably a reactivity moderator D, which RMA components A and B form an organic binder network in a cured RMA crosslinked coating. The inventors have found a very good adhesion of the cured RMA crosslinked coating to the primer layer and the coating system provides improved adhesion of the cured RMA crosslinked coating on substrates, in particular to polar substrates such as for example metal substrates.

In another aspect, the invention relates to the use of the specified primer coating composition for improving adhesion of a RMA crosslinkable coating composition, in particular to polar substrates such as for example metal substrates.

In yet another aspect, the invention relates to a method for coating a substrate and to coated substrates coated with the coating system of the invention.

Suitable RMA crosslinkable compositions are known in the art. WO11124663, WO11124664 and WO11124665 describe RMA crosslinkable compositions with latent base catalyst comprising carbon dioxide blocked base catalyst which generate a strong base on carbon dioxide deblocking in the coating layer. WO14166880 describes RMA crosslinkable compositions with a catalyst that does not rely on carbon dioxide deblocking, which is particularly suitable for layers where evaporation is hindered, for example for thicker layers. WO13050622, WO13050623, WO13050624 and WO13050574 describe RMA crosslinkable compositions with special pot-life and open time moderators. WO16166361, WO16166381 and WO16166382 describe RMA crosslinkable composition suitable for use in flooring, RMA crosslinkable composition with dual curing properties and RMA crosslinkable composition with easy to clean properties. The description of the various embodiments of the RMA crosslinkable compositions in these prior art documents is herewith enclosed by reference. In particular reference is made to the above identified prior art concerning detailed description of all components in the RMA crosslinkable composition A, B, C or D, their preparation, the amounts used in the RMA crosslinkable composition as well as for measurement methods and definitions and the description thereof is hereby incorporated by reference and applicable unless described otherwise herein. Most important features are described below in summary.

In general it is preferred that component A is malonate or acetoacetate, preferably dominantly a malonate, and component B is acryloyl. It is preferred that the one or more components A in the RMA crosslinkable component predominantly comprise one type of components, predominantly meaning preferably more than 50, 75, 90 and most preferably 100% of the C—H reactive groups in RMA crosslinkable component A are from one type of component A, preferably from malonate or acetoacetate and most preferably consisting predominantly of malonate and acetoacetate as the remainder component A. The most preferred component B is an acryloyl.

The components A and B are preferably built into a polymer chain or pending or terminal pending on a polymer chain. Preferably, the one or more RMA crosslinkable components are one or more polymers chosen from the group of polyesters, alkyds, polyurethanes, polyacrylates, epoxy resins, polyamides and polyvinyl resins which contain components A or B in the main chain, pendant, terminal or combinations thereof.

The one or more RMA crosslinkable components can be monomeric but preferably at least one RMA crosslinkable component is a polymeric component with a weight average molecular weight Mw of at least 250 g/mol, preferably a polymer having Mw between 300 and 5000, more preferably between 400 and 4000 or 500 and 3000 g/mol (as determined by GPC).

The relative amounts of the RMA crosslinkable components in the RMA crosslinkable composition are chosen such that the molar ratio of activated unsaturated reactive group C=C in component B to the activated acidic reactive groups C—H in component A is between 0.5 and 2 and preferably between 0.75-1.5 or 0.8-1.2. In case a reactive diluent is present having 2 C—H reactive groups (for example malonate) then these are also included in the total amount of C—H in the above ratio as they are RMA crosslinkable components.

The RMA crosslinkable composition preferably further comprises a reactivity moderator D comprising an X—H group that is also a Michael addition donor reactable with component B under the action of catalyst C, wherein X is C, N, P, O or S for improving open time and hence working time of application of a coating composition.

The X—H group in component D, preferably an N—H group containing component, has a pKa (defined in aqueous environment) of at least one unit, preferably two units, less than that of the C—H groups in predominant component A, preferably the pKa of the X—H group in component D is lower than 13, preferable lower than 12, more preferably lower than 11, most preferably lower than 10; it is preferably higher than 7, more preferably 8, more preferably higher than 8.5.

The component D preferably comprises a molecule containing the N—H as part of a group —(C=O)—NH—(C=O)—, or of a group —NH—(O=S=O)— or a heterocycle in which the nitrogen of the N—H group is contained in a heterocyclic ring preferably chosen from the group of a substituted or unsubstituted succinimide, glutarimide, hydantoin, triazole, pyrazole, immidazole or uracil, preferably chosen from the group of succinimides, benzotriazoles and triazoles.

The component D is present in an amount between 0.1 and 10 wt %, preferably 0.2 and 7 wt %, 0.2 and 5 wt %, 0.2 and 3 wt %, more preferably 0.5 and 2 wt % relative to the total amount of the RMA crosslinkable components A or B and component D. The component D is present in such amount that the amount of X—H groups in component D is no more than 30 mole %, preferably no more than 20, more preferably no more than 10, most preferably no more than 5 mole % relative to C—H donor groups from component A present in the crosslinkable polymer.

In principle the RMA crosslinking reaction can be catalysed by any base known in the art. Some of the usual Michael catalysts are alkali metal hydroxides, alkali metal alkoxides, quaternary ammonium hydroxides (such as tetraalkyl ammonium hydroxides), and amine compounds (such as diaza compounds, guanidine compounds, amidines including cyclic amidines, pyridine, imidazoline). Suitable catalysts are for example described in EP1462501, herewith incorporated by reference.

The catalyst C can be preferably a carbon dioxide blocked strong base catalyst, more preferably a quaternary alkyl ammonium bi- or alkylcarbonate (as described in EP2556108). As this catalyst generates $CO_2$ it is preferred for use in coating layers with a thickness up to 500, 400, 300, 200 or 150 micrometer.

A homogeneous base catalyst C, which is more suitable for thicker coating layers, is described in EP0326723 which is a catalyst consisting of the combination of a tertiary amine and an epoxide or in PCT/EP2014/056953 describing a homogeneous catalyst C being a salt of a basic anion X— from an acidic X—H group containing compound wherein X is N, P, O, S or C, and wherein anion X— is a Michael Addition donor reactable with component B and anion X— is characterized by a pKa(C) of the corresponding acid X—H of more than two units lower than the pKa(A) of the majority component A and being lower than 10.5. Suitable catalyst described in the prior art are hereby incorporated by reference.

In view of the fact that the RMA crosslinking reaction is base catalyzed, acidic components should not be used in the composition such that the acid base reaction between catalyst C and A and optionally D is not interfered. Preferably the composition is essentially free of acidic components.

The RMA composition may comprise one or more organic solvents required for dissolving certain components or for adjusting the RMA composition to an appropriate handling viscosity (eg for spraying application). Organic solvents for use in RMA crosslinkable compositions are common coating solvents that do not contain acid impurities like alkyl acetate (preferably butyl or hexyl acetate), alcohol (preferably C2-C6 alcohol), N alkyl pyrrolidine, glycolether, Dipropylene Glycol Methyl Ether, Dipropylene Glycol Methyl Ether, Propylene Glycol Methyl Ether Acetate, ketones etc. or In a preferred embodiment an alcohol is used as solvent comprising 2 to 12 carbon atoms as this may improve open time.

The amount of volatile solvent can be between 0 and 60, 50 or 40 wt % but in view of QESH preferably the composition has a low volatile organic compounds (VOC) content and therefore the amount of volatile organic solvent is preferably less than 20, 15, 10, 5 and most preferably less than 2 or even 1 wt % relative to the total weight of the RMA crosslinkable components A and B.

In particular where a low viscosity and a low VOC is required it is preferred that the RMA crosslinkable composition comprises one or more reactive diluents which react with RMA crosslinkable components A or B. The one or more reactive diluents are preferably selected from the group of monomeric or dimeric components A, monomeric or dimeric components B, compounds A' having only 1 reactive acidic proton (C—H) in activated methylene or methine groups, compounds B' having only 1 reactive unsaturated group (C=C), most preferably alkyl acetoacetates, dialkyl malonates, mono- or diacrylates of limited molecular weight. The total amount of volatile organic solvent plus reactive solvents is between 0 and 30 wt % and the volatile organic solvent is less than 5 wt % relative to the total weight of the RMA composition.

Crosslinking systems based on combinations of ketimine- and acetoacetate functional binder components are known in the art, and descriptions of ketimine and acetoacetate functional components can be found in U.S. Pat. No. 5,011,994 or EP0199087, the content of which is incorporated by reference in this application.

U.S. Pat. No. 5,011,994 describes a colorless ketimine or an adduct thereof and the use as a cross-linking agent in a curable coating based on resins containing functional groups such as anhydride, epoxy, isocyanate, acetoacetate and 1,3 ethylenically unsaturated carbonyl, wherein the ketimine is the adduct of a polyamine having a primary and a secondary amino group and containing at least 3 carbon atoms in a linear chain between both amino groups, and a ketone containing not more than 8 carbon atoms and having methylene groups adjacent to the carbonyl group.

EP0199087 describes liquid coating composition based on a polyacetoacetate and a polyamine having primary and/or secondary amino groups and blocked with a ketone or an aldehyde having not more than 18 carbon atoms forming a polyketimine, said composition is characterised in using a specific polyacetoacetate with acetoacetate groups present as ester of hydroxyalkyl acrylate, hydroxyalkyl methacrylate or allyl alcohol structural units.

The coating system according to the invention preferably comprises I. a primer coating composition comprising a) a binder component PA that contains primary amine functionality blocked with a ketone or aldehyde, preferably a ketone, b) a binder component PB that contains acetoacetate or acetoacetamide, preferably acetoacetate-, functional groups, which components PA and PB form an organic binder network in a cured primer coating and II. a RMA crosslinkable coating composition forming an organic binder network in a cured RMA crosslinked coating.

The primer coating composition further may comprise one or more other binder components PC that are co-reactive with component PA or PB, preferably in an amount less than 20 wt %, preferably less than 10 wt % and more preferably less than 5 wt % relative to the total weight of the binder solids in the primer coating composition. Preferably the ketone or aldehyde, preferably the ketone, in component PA is volatile. The boiling point of the ketone or aldehyde is preferably below 200° C., preferably below 160° C., 140° C., or even below 120° C. A volatile ketone or aldehyde has the advantage that it easily evaporates from the primary coating layer driving the deblocking equilibrium to completion and thus providing a rapid curing of the primer layer. A ketone is preferred because aldehydes tend to be smelly. Ketones are good leaving groups. The primary amine on the binder component PA, formed after deblocking of the ketone, is able to form an enamine bond in combination with the acetoacetate or acetoacetamide functional groups of component PB.

It is preferred that the number average functionality Fn of ketimine or aldimine groups in component PA is at least 2, preferably 3 and more preferably at least 4. Fn is preferably below 20, preferably below 10, and more preferably below 6. Further, the ketimine or aldimine equivalent weight of component PA is preferably at least 120 and preferably at least 150 gr/mole and typically below 2000, preferably below 1000 gr/mole. The functionality Fn is the average number of functional groups per chain and is the number average molecular weight Mn, as determined by GPC, divided by the equivalent weight EQW, i.e. the average molecular weight per functional groups, determined by titration of the functional groups in the manner known in the art. The functionality Fn is preferably chosen high in view of crosslinking density but should not be chosen too high in view of having an acceptable potlife because high functionality results in high reactivity decreasing the potlife.

A preferred component PA comprises, preferably is, the reaction product of a) a polyamine compound, preferably an amine compound according to formula I: $H_2N\{-(CH_2)_n-NH\}_m-(CH_2)_n-NH_2$ with n preferably being 2 or 3, and m preferably being 1 or 2, most preferably diethylene triamine, b) epoxides, isocyanates or electro-deficient unsaturated C=C double bonds, preferably acrylates, having a reactive functionality of preferably at least 2 towards the secondary amine group —NH in the polyamine compound, preferably the amine compound of formula I, c) a ketone or aldehyde blocking the primary amine groups of the amine compound. Preferably, the component b) above is a di-epoxy, for example Bisphenol A diglycidyl ether. A suitable commercially available ketimine functional component PA is for example Setalux 10-1440.

In the coating system according to the invention the number average acetoacetate/acetoacetamide functionality Fn of component PB typically is at least 2, preferably at least 3, more preferably at least 4 and preferably less than 20, more preferably less than 10. The acetoacetate or acetoacetamide equivalent weight EQW of component PB is preferably at least 100, more preferably at least 200, even more preferably at least 300, and preferably at most 2500, more preferably at most 1500, most preferably at most 1200 gr/mol. The functionality Fn and EQW of component FB is similarly defined as described above for the component PA. Also for the primer component PB, the functionality Fn is preferably chosen high in view of the crosslinking density but should not be chosen too high in view of having an acceptable potlife because high functionality results in high reactivity decreasing the potlife.

In the coating system according to the invention component PB comprises an acrylic (co-)polymer in which the acetoacetate functional group is introduced a) through (co-)polymerization of an acetoacetate- or acetoacetamide functional (meth-)acrylic comonomer, for example acetoacetoxyethylmethacrylate, or b) wherein the acetoacetate functional group is introduced by transesterification of an acetoacetate-ester of a low molecular weight alcohol, with a polyfunctional hydroxyl structure of low, medium or high molecular weight typically below 1000, preferably below 500, more preferably below 250 gr/mole.

The low molecular weight alcohols can be diols, triols as for example trimethylol propane, tetraols, or higher functionality materials; higher molecular weight structures can be built by either using prebuild higher molecular weight polyols to be used for acetoacetylation, or components with hydroxyl functionality left after acetoacetylation can be further extended in molecular mass through OH-reactive components. Besides transesterification, reaction of hydroxyl- or amine-functional structures with ketene or diketene can also be used to create acetoacetate or acetoacetamide functional groups, respectively. Setal 26-3701 is an acetoacetate functional material which has a very low molecular weight and a very low viscosity since it is trimethylol propane TMP reacted with t-butyl acetoacetate (t-BAA) comprising, about 1 mole TMP to 3 moles of t-BAA.

Component PB can also be mixtures of different components PB. In a particular embodiment a mixture of high molecular weight acetoacetate functional polymer with a low molecular weight acetoacetate functional polymer can be used; for example an acetoacetate functional acrylic resin combined with TMP-tri-acetoacetate as described in the examples using Setal 26-3705 (an acetoacetate functional polyester) and Setal 26-3701 (tri-methyl propanol (TMP) functionalized with acetoacetate). Component PA can also be mixtures of different components PA.

The primer composition component PB can be a polyacrylic or polyester, preferably polyacrylic, resin comprising acetoacetate functional groups and the component PA preferably is ketimine modified acrylic or epoxy.

In the coating system the total amount of the binder component PA, binder component PB and optional other binder components PC in the primer composition is typically at least 50 wt %, preferably at least 60, 80 or 90 wt % relative to the total dry solids weight of the primer composition not including pigments. The primer formulation optionally also contains organic solvents, (anti-corrosive) pigments, fillers, and further additives typical for coating applications, as generally known to those skilled in the art. Preferably the powder composition comprises a volatile organic solvent or a mixture of solvents, preferably containing a ketone.

The ratio of acetoacetate or acetoacetamide functional groups in component PB to ketimine or aldehyde functional groups in component PA, is between 1:10 and 10:1, preferably between 1:5 and 5:1, more preferably between 1:3 and 3:1, most preferably between 1:2 and 2:1. In view of the stoichiometry of the reactive groups of components PA and PB and making optimal use of the crosslinkable functional groups in the composition it is preferred that the ratio is close to 1. An excess of functional groups PA or PB is however a possibility. In a preferred embodiment an excess of ketimine or aldimine functional groups is used.

The coating system according to the invention is used for preparing a coating on a substrate wherein a layer of the RMA crosslinkable composition is applied onto the primer coating layer. The coating system can be in the form of a kit of parts comprising one or more parts comprising the components PA and PB of the primer coating composition and one or more separate parts comprising the components A, B and C of the RMA crosslinkable composition.

The invention also relates to the use of a primer coating composition comprising a ketimine or aldimine functional binder component PA, an acetoacetate- or acetoacetamide functional binder component PB and optionally an organic solvent T1 as a primer on a substrate for improving adhesion of a RMA crosslinkable coating.

The invention further relates to a method for applying a RMA crosslinked coating on a substrate, comprising the steps of a) applying on a surface of a substrate, preferably a polar substrate and more preferably a metal substrate, a layer of a primer coating composition as described above, b) at least partially curing the layer of the primer coating composition to form a primer layer, preferably at ambient conditions, preferably at temperatures between 10 and 50° C., c) applying over the primer layer, a layer of the RMA crosslinkable coating composition, preferably as a top coating layer, d) curing the RMA crosslinkable coating layer, preferably at ambient conditions, preferably at temperatures between 10 and 50° C.

At least partially curing includes at least partially drying to form a primer layer that still contains reactive functional groups when applying a layer of the RMA crosslinkable coating composition. As a preferred minimum, a minimum flash time is used between the primer application and the application of the RMA crosslinkable layer, typically a 10 minute flash to evaporate fast evaporating solvents from the primer coating film.

In a particular embodiment the primer layer is only partially cured when applying a layer of the RMA crosslinkable coating composition. This not only saves time but also improves the adhesion with the later applied RMA crosslinkable coating layer. In view of coating appearance it may be advantageous to at least have some degree of curing. The degree of curing in partial curing can be established by the skilled person for example by taking less than the normal time needed for full curing and conversion of functional groups can be measured e.g. by spectroscopic techniques.

The curing temperatures both for the primer and for the RMA crosslinkable coating layer can be well above ambient conditions, but the particular advantage of this coating system is that it can be cured at ambient conditions. So the curing temperatures can be between 0 and 100° C., but preferably between 10 and 70° C., more preferably between 10 and 50° C. The primer curing is typically done at ambient conditions and drying/curing overnight, i.e. between 8 and 20 hours. However, faster curing can be achieved by forced drying at elevated temperatures.

The primer can be applied to a variety of substrates, in particular the substrate could be another coating layer. Coating layers suitable as substrates for the primer include two-component epoxy-amine coatings, cathodic electro-deposition (CED) coatings, two-component polyurethane coatings and other commonly used 1K or 2K coatings systems. Metals are suitable substrates for the primer, especially steel substrates including all types of pretreated steel such as electrocoated, zinc (galvanized), and phosphated steel; aluminium substrates including chrome treated and non-chrome treated aluminum. In view of the low curing temperature, the coating system can be used to coat more heat sensitive substrates. The substrate can be an apolar substrate such as for example plastic substrates. Non-limiting examples are ABS substrates, polycarbonate substrates, ABS/polycarbonate substrates, glass- and carbon-fiber reinforced plastics or composites, SMC (sheet molding compound) such a polyester and glass fiber combinations, especially those used in automotive applications, poly(ethylene terephthalate), poly(butylene terephthalate), polyamide-6, polyamide-6.6, (thermoplastic) polyolefins, poly(vinyl chloride), poly(methyl methacrylate) and polystyrene. The primer may also be applied on multisubstrate assemblies composed of metal and/or plastic parts with various different pretreatments and/or coatings including those mentioned above. Most preferably the substrate is metal. The RMA coating layer may not be the topcoat and could also be coated with a further coating layer, but preferably the RMA coating layer is the top coating layer, in particular when using a blocked catalyst such as for example the carbondioxide blocked latent base catalyst.

The invention also relates to a coated substrate having improved adhesion and resistance against weathering comprising a primer and a coating layer formed from the coating system according to any of the embodiments described above.

EXAMPLES

The following is a description of certain embodiments of the invention, given by way of example only.

Adhesion Test:

The results of adhesion stated in the following examples are based on the cross cut adhesion test following the ISO/DIN 2409, ASTM D3359 protocol. The ranking is briefly summarized as follows:

0: The edges of the cuts are completely smooth; none of the squares of the lattice is detached.

1: Detachment of small flakes of the coating at the intersection of the cuts. A cross-cut area not significantly greater than 5% is affected.

2: The coating has flaked along the edges and/or at the intersection of the cuts. A cross-cut area significantly greater than 5%, but not significantly greater than 15% is affected.

3: The coating has flaked along the edges partly or wholly in large ribbons, and/or it has flaked partly or wholly on different parts of the squares. A cross-cut area significantly greater than 15%, but not significantly greater than 35%, is affected.

4: The coating has flaked along the edges of the cuts in large ribbons and/or same squares have detached partly or wholly. A cross-cut area significantly greater than 35%, but not significantly greater than 65% is affected.
5: Any degree of flaking that cannot even be classified by classification 4.

Metal Substrate:

To test the adhesion of given examples and comparative examples, films were applied onto a metal substrate Bonderite® 1000. Bonderite® is a trade name of the German producer "Henkel".

General Procedure for Preparation of RMA Crosslinkable Paint

A malonate containing polymer (RMA crosslinkable component A) is mixed with TMPTA (Trimethylolpropane triacrylate) (RMA crosslinkable component B) and the thinner n-propanol and optionally with pigments or other coating additives and stirred till a homogenous coating composition was obtained. Prior to application as a coating, all mentioned formulations were activated by adding the stated amount of latent base catalyst which is a tetrabutyl ammoniumhydroxide TBAH solution reactively blocked with di-methylcarbonate or di-ethylcarbonate, with a base concentration of 0.7 to 0.928 meq/g solution (see procedure for preparation of catalyst solutions).

Preparation of Malonated Polyester Resins MPE1

This resin is prepared as follows: into a reactor provided with a distilling column filed with Raschig rings were brought 382 g of neopentyl glycol, 262.8 g of hexahydrophthalic anhydride and 0.2 g of butyl stannoic acid. The mixture was polymerised at 240° C. under nitrogen to an acid value of 0.2 mg KOH/g. The mixture was cooled down to 130° C. and 355 g of diethylmalonate was added. The reaction mixture was heated to 170° C. and ethanol was removed under reduced pressure. The resins was diluted with butyl acetate to 85% solids, to yield a material with OH value of 16 mg KOH/g, GPC Mn=1750 g/mole, and a malonate equivalent weight of 350 (active C—H EQW 175).

Preparation of Malonated Alkyd MA1

MA1 is a malonated alkyd (Acure 510-300, available from Allnex) using coconut oil as the oil component, an oil length of 30%, an OH value of 108 mg KOH/g, a GPC Mn of 1800 g/mole and a Mw of 4350 g/mole. The malonate equivalent weight of this material is 360 (active C—H equivalent weight 180).

Paint Preparation: Paints a, B and C

Paint A was prepared by mixing the components as described in Table 1 below. Paint A is based on malonated polyester resin MPE1 and TMPTA.

TABLE 1

Real Michael Addition Clear Paint

| Component | Paint A |
| --- | --- |
| MPE1 | 10.00 |
| TMPTA | 3.47 |
| Silmer ACR-D2** | 0.03 |
| Methyl propyl ketone | 5.00 |

**Silmer ACR-D is reactive silicone comprising multi-functional or linear-difunctional silicone pre-polymers with reactive terminal end groups being acrylates.

Paint B was prepared by making a mill base using TMPTA (550-100 in Table 2) and then letting it down to make a Real Michael Addition paint with malonated alkyd resin MA1 (510-300 in Table 2), TMP-tri acetoacetate, (510-400 in Table 2) and TMPTA (550-100 in Table 2).

TABLE 2

Real Michael Addition White Paint B

| Mill base | |
| --- | --- |
| 550-100 | 1005 |
| Disperbyk 163 | 63.6 |
| Kronos 2310 | 2112 |
| Letdown | |
| 510-300 | 1390 |
| 510-400 | 245 |
| 550-100 | 24 |
| Isopropanol | 227 |
| 80:20 MAK:IBIB | 433 |
| TOTAL Part A | 5499.25 |

MAK:IBIB is methylamylketone:isobutylisobutyrate.
Disperbyk 163 is: Wetting and dispersing additive from Byk
Kronos2310 is: titanium dioxide pigment Catalyst Preparation Examples:

Catalyst compositions were prepared by mixing components specified in Table 3.

TABLE 3

Catalyst compositions

| Component | Catalyst 1 | Catalyst 2 |
| --- | --- | --- |
| Aqueous TBAH (40%) | 35.8 | |
| Aqueous TBAH (55%) | | 267.6 |
| Diethylcarbonate | 0 | 121.19 |
| Dimethylcarbonate | 21.7 | 0 |
| n-propanol | 0 | 182.4 |
| 2-propanol | 1.5 | 0 |
| DI Water | 19.2 | 29.88 |

Preparation of Acrylic Ketac Primer Example 1.

A clear primer paint was made by thoroughly mixing 224.75 g of an acetoacetate functional acrylic resin, Setalux 17-1450 with 45 g of methyl amyl ketone and mixing fifty grams thereof with 9.27 g of a ketimine functional compound A, and 5.43 g of methyl isobutyl ketone.

Ketimine functional compound A is a tetrafunctional ketimine compound, which is the reaction product of 2 moles of DETA (diethylenetriamine) on 1 mole of DGEBPA (Bisphenol A diglycidyl ether) wherein the primary amine groups are blocked as ketimine by reacting with excess MIBK (Methyl isobutyl ketone).

The clear primer paint of Example 1 was sprayed onto a Bonderite® 1000 treated steel panel and allowed to dry overnight (16 hours). The next day 58.49 g of Paint A was catalyzed with 1.97 g of Catalyst 1, thoroughly mixed and then sprayed onto the primed panel and allowed to air-dry overnight (16 hours). The next day adhesion was tested using the cross-cut adhesion test as described in ASTM D3359 and found to be very good, ASTM rating 0.

Comparative Example 1: Epoxy Primer

An epoxy primer, Aquapon 97-137 was activated with hardener 97-1200 at the volume ratio suggested by the producer (PPG) and sprayed onto a Bonderite®1000 steel panel and allowed to air-dry overnight (16 hours). The next day 58.49 g of Paint A was catalyzed with 1.97 g of Catalyst 1, thoroughly mixed and then sprayed onto the epoxy primed panel and allowed to air-dry overnight (16 hours). The next day adhesion was tested using the cross-cut adhesion test as described in ASTM D3359 and found to be very bad, ASTM rating 5.

Preparation of Polyester Ketac Primer Example 2.

A pigmented polyester Ketac primer was made by first making a millbase as shown in Table 4 and then making the letdown also shown in Table 4 and adding and mixing to 84.15 g thereof (Part A in Table 4) an amount of 15.85 g of a ketimine functional compound A.

A mixture of two different acetoacetate functional polyesters (primer binder component PB) were used: Setal 26-3705 is an acetoacetate functional polyester. Setal 26-3701 is tri-methyl propanol (TMP) functionalized with acetoacetate. The ketimine functional component PA used in the examples is always the above described ketimine functional compound A. The ratio of Ketimine to acetoacetate functional groups in all examples was 1.21 to 1.

TABLE 4

Ketac Pigmented Primer

| Millbase | Wt. | Description |
| --- | --- | --- |
| Setal 26-3705 | 123.32 | AcetoAcetate functional polyester |
| Setal 26-3701 | 38.15 | AcetoAcetate functional polyester |
| Disperbyk 110 | 26.07 | Pigment dispersant |
| Vansil W40 | 60.78 | extender pigment |
| Vantalc 4000 | 60.78 | extender pigment |
| R900 | 283.63 | TiO2 |
| Gamma Sperse 80 | 243.17 | Calcium carbonate |
| Heucophos ZAPP | 162.09 | phosphate pigment |
| Bentone SD1 | 2.01 | anti-settling clay |
| TOTAL | 1000.0 | |

| Letdown - Part A | | Description |
| --- | --- | --- |
| Millbase | 857.23 | |
| n-Butyl Acetate | 70.96 | solvent |
| Methy Amyl Ketone | 70.96 | solvent |
| Dow Paint Additive #3 | 0.85 | surface active additive |
| TOTAL | 1000.0 | |

| Paint | Weight | |
| --- | --- | --- |
| Part A | 84.15 | |
| Setalux 10-1440 | 15.85 | Ketimine functional resin |

The primer was then sprayed onto a Bonderite®1000 steel panel and allowed to air-dry overnight (16 hours). The next day 50 g of Paint B was mixed with 1.34 g of Catalyst 2, thoroughly mixed and then sprayed onto the Ketac primed panel and allowed to air-dry overnight (16 hours). After 3 days, adhesion was tested using the cross-cut adhesion test as described in ASTM D3359 and found to be very good, ASTM rating 0. Next the panel was placed onto a QCT test cabinet set at 40° C. and exposed to condensing humidity for 135 hours. The adhesion was tested again using the cross-cut adhesion test as described in ASTM D3359 and found to be very good, ASTM rating 0.

Comparative Example 2: Epoxy Primer

An epoxy paint, Devran 201H was activated with hardener at the volume ratio suggested by the producer (IP) and sprayed onto a Bonderite®1000 steel panel and allowed to air-dry for 48 hours. The epoxy primed panel was then painted with a Real Michael Addition paint by mixing 50 g of Paint B with 1.34 g of Catalyst 2, thoroughly and then sprayed onto the epoxy primed panel and allowed to air-dry overnight (16 hours). After 3 days, adhesion was tested using the cross-cut adhesion test as described in ASTM D3359 and found to be okay, ASTM rating 3. Next the panel was placed onto a QCT test cabinet set at 40° C. and exposed to condensing humidity for 135 hours. The adhesion was tested again using the cross-cut adhesion test as described in ASTM D3359 and found to be very bad, ASTM rating 5.

Example 3

The primer described in Table 4 was spray-applied to plastic substrates listed in Table 5. The primer was then baked for 30 minutes at 65° C. The primed panels were then painted with a Real Michael Addition paint by mixing 50 g of Paint B with 1.34 g of Catalyst 2. The panel was then baked for 30 minutes at 65° C. Adhesion was tested using the cross-cut adhesion test as described in ASTM D3359 and found to be good, ASTM rating 0. Next the panels were placed onto a QCT test cabinet set at 40° C. and exposed to condensing humidity for 168 hours. The adhesion was tested again using the cross-cut adhesion test as described in ASTM D3359 and found to be good, ASTM rating

TABLE 5

| plastic substrates |
| --- |
| ABS |
| Polycarbonate |
| Polycarbonate/ABS blend |

Thus, the invention has been described by reference to certain embodiments discussed above. It will be recognized that these embodiments are susceptible to various modifications and alternative forms well known to those of skill in the art.

The invention claimed is:
1. A coating system comprising
 I. a primer coating composition comprising
  a. a binder component PA that contains primary amine functionality blocked with a ketone or aldehyde,
  b. a binder component PB that contains acetoacetate or acetoacetamide functional groups,
   which components PA and PB form an organic binder network in a cured primer coating, and
  c. optionally one or more other binder components PC that are co-reactive with the component PA or PB, in an amount less than 20 wt % relative to a total weight of binder solids in the primer coating composition,
  wherein a total amount of the binder component PA, binder component PB and optional other binder components PC in the primer composition is at least 80 wt % relative to a total dry solids weight of the primer composition not including pigments, and
  wherein a ratio of the acetoacetate or the acetoacetamide functional groups in the component PB to ketimine or aldimine functional groups in the component PA is between 1:3 and 3:1; and
 II. a Real Michael Addition (RMA) crosslinkable coating composition comprising,
  a) a component A with at least two acidic protons C-H in activated methylene or methine groups,
  b) a component B with at least two activated unsaturated C=C groups,
  c) a catalyst C for catalyzing the RMA crosslinking reaction between components A and B, and
  d) optionally a reactivity moderator D, which RMA components A and B form an organic binder network in a cured RMA crosslinked coating.

2. The coating system of claim 1, wherein the primer coating composition comprises the one or more other binder components PC that are co-reactive with component PA or PB, in an amount less than 10 wt % relative to the total weight of the binder solids in the primer coating composition.

3. The coating system of claim 1, wherein the ketone or aldehyde, is volatile, having a boiling point below 200° C.

4. The coating system of claim 1, wherein a number average functionality Fn of ketimine or aldimine groups in component PA is at least 2 and below 20, and wherein the ketimine or aldimine equivalent weight of component PA is at least 120 g/mole and below 2000 g/mole.

5. The coating system of claim 1, wherein component PA is the reaction product of
  a. an amine compound according to formula I:
     $H_2N \{-(CH_2)n-NH\}_m-(CH2)n-NH_2$
     with n being 2 or 3, and m being 1 or 2,
  b. epoxides, isocyanates or electrodeficient unsaturated C=C double bonds, having a reactive functionality towards secondary amine group —NH in the amine compound, and
  c. a ketone or aldehyde for blocking the primary amine groups of the amine compound.

6. The coating system of claim 1, wherein the number average acetoacetate/acetoacetamide functionality Fn of component PB is at least 2 and less than 20 and the acetoacetate or acetoacetamide equivalent weight of component PB is at least 100 and at most 2500 g/mol.

7. The coating system of claim 1, wherein component PB comprises an acrylic (co-)polymer in which the acetoacetate or acetoacetamide functional groups are introduced
  a. through (co-)polymerization of an acetoacetate- or acetoacetamide functional (meth-)acrylic comonomer, or
  b. wherein the acetoacetate functional group is introduced by transesterification of an acetoacetate-ester of a low molecular weight alcohol, with a polyfunctional hydroxyl structure of a molecular weight below 1000 g/mole.

8. The coating system of claim 1, wherein in the primer composition component PB is an polyacrylic or polyester resin comprising acetoacetate functional groups and wherein the component PA is ketimine modified acrylic or epoxy.

9. The coating system of claim 1, wherein the total amount of the binder component PA, binder component PB and optional other binder components PC in the primer composition is at least 90 wt % relative to the total dry solids weight of the primer composition not including pigments.

10. The coating system of claim 1, wherein the ratio of acetoacetate or acetoacetamide functional groups in component PB to ketimine or aldimine functional groups in component PA, is between 1:2 and 2:1.

11. The coating system of claim 1, wherein the RMA crosslinkable coating composition comprises a RMA crosslinkable component with components A being predominantly malonate or an acetoacetate and component B being an acryloyl.

12. The coating system of claim 1, in the form of a kit of parts comprising one or more parts comprising the components PA and PB of the primer coating composition and one or more separate parts comprising the components A, B and C of the RMA crosslinkable composition.

13. A method for applying a RMA crosslinked coating on a substrate using the coating system according to claim 1, comprising the steps of
  a) applying on a surface of the substrate, a layer of the primer coating composition of the coating system,
  b) at least partially curing the layer of the primer coating composition to form a primer layer,
  c) applying over the primer layer, a layer of the RMA crosslinkable coating composition of the coating system, and
  d) curing the layer of the RMA crosslinkable coating composition.

14. A coated substrate comprising a primer and a coating layer formed from the coating system according to claim 1.

15. A coated substrate comprising a primer and a coating layer formed from the method according to claim 13.

* * * * *